United States Patent
Xu et al.

(10) Patent No.: US 12,342,394 B2
(45) Date of Patent: *Jun. 24, 2025

(54) METHOD AND APPARATUS FOR COMMUNICATION CONNECTION, ELECTRONIC DEVICE, AND WIRELESS TRANSMISSION SYSTEM

(71) Applicants: VeriSilicon Microelectornics (Chengdu) Co., Ltd., Chengdu (CN); VeriSilicon Microelectronics (Shanghai) Co., Ltd., Shanghai (CN); VeriSilicon Microelectronics (Nanjing) Co., Ltd., Nanjing (CN); VeriSilicon Holdings Co., Ltd., Grand Cayman (KY)

(72) Inventors: Jiangcheng Xu, Chengdu (CN); Keyu Xiang, Sichuan (CN)

(73) Assignees: VeriSilicon Microelectronics (Chengdu) Co., Ltd., Chengdu (CN); VeriSilicon Microelectronics (Shanghai) Co., Ltd., Shanghai (CN); VeriSilicon Microelectronics (Nanjing) Co., Ltd., Nanjing (CN); VeriSilicon Holdings Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 18/762,043

(22) Filed: Jul. 2, 2024

(65) Prior Publication Data

US 2024/0381450 A1 Nov. 14, 2024

Related U.S. Application Data

(63) Continuation of application No. 17/526,923, filed on Nov. 15, 2021, now Pat. No. 12,200,781.

(30) Foreign Application Priority Data

Mar. 16, 2021 (CN) .......................... 202110283326.X

(51) Int. Cl.
*H04W 76/10* (2018.01)
*H04R 1/10* (2006.01)
(Continued)

(52) U.S. Cl.
CPC .......... *H04W 76/10* (2018.02); *H04R 1/1016* (2013.01); *H04W 24/08* (2013.01);
(Continued)

(58) Field of Classification Search
CPC ..... H04W 76/10; H04W 24/08; H04W 76/14; H04W 4/80; H04R 1/1016; H04R 5/033; H04R 2420/07; Y02D 30/70
See application file for complete search history.

(56) References Cited

U.S. PATENT DOCUMENTS

2019/0045540 A1* 2/2019 Yoshimoto ............ H04W 74/06
2019/0116621 A1* 4/2019 Wen ...................... H04W 24/02
2020/0107108 A1* 4/2020 Gong ...................... H04L 45/12

* cited by examiner

*Primary Examiner* — Kwang B Yao
*Assistant Examiner* — Bradley D Lytle, Jr.
(74) *Attorney, Agent, or Firm* — Armis Intellectual Property Law, LLC

(57) ABSTRACT

Provided are a method and apparatus for communication connection, an electronic device, and a wireless transmission system. The method includes: determining a time to send an $N^{th}$ connection request to an $N^{th}$ slave device in the wireless transmission system, and determining an initial anchor point of an $N^{th}$ connection link according to a relationship between the time to send the $N^{th}$ connection request and a time point at which a connection event in a first connection link occurs; and sending the $N^{th}$ connection request to the $N^{th}$ slave device so that the $N^{th}$ connection link is established (Continued)

between the master device and the $N^{th}$ slave device, wherein there is an identical connection interval between anchor points in each link, and a connection event in each connection interval in each link occupies 1/M of the connection interval.

9 Claims, 4 Drawing Sheets

(51) Int. Cl.
*H04W 24/08* (2009.01)
*H04W 76/14* (2018.01)
*H04R 5/033* (2006.01)

(52) U.S. Cl.
CPC ............ *H04W 76/14* (2018.02); *H04R 5/033* (2013.01); *H04R 2420/07* (2013.01); *Y02D 30/70* (2020.08)

METHOD AND APPARATUS FOR COMMUNICATION CONNECTION, ELECTRONIC DEVICE, AND WIRELESS TRANSMISSION SYSTEM

CROSS-REFERENCE TO RELATED APPLICATIONS

The present disclosure is a continuation of U.S. patent application Ser. No. 17/526,923, filed Nov. 15, 2021, entitled "Method and Apparatus for Communication Connection, Electronic Device, and Wireless Transmission System", which claims the priority to Chinese Patent Application No. 202110283326X, entitled "Method and Apparatus for Communication Connection, Electronic Device, and Wireless Transmission System", filed with the Chinese Patent Office on Mar. 16, 2021, the entire contents of which are incorporated herein by reference.

TECHNICAL FIELD

The present disclosure relates to the technical field of communications, and in particular to a method and an apparatus for communication connection, an electronic device, and a wireless transmission system.

BACKGROUND ART

With the widespread development of the Bluetooth technology, Bluetooth products and services have become a part of people's lives, and especially audio applications such as Bluetooth earphones (or headphones) and Bluetooth speakers centered on smart phones have brought great convenience to people's lives. Fully wirelessly connected dual wireless stereo playback devices, such as dual wireless stereo Bluetooth earphones and dual wireless stereo Bluetooth speakers, are more popular with people. All the above-mentioned wireless Bluetooth devices can establish separate communication links with master devices (such as mobile phones).

However, in such a current multi-link connection system, the first anchor point in each link is determined from a time point at which the slave device is scanned by the master device. The first anchor points are determined at random with uncertainty, and there is an uneven allocation of link resources among multiple links and the links cannot be efficiently utilized due to the uncertain determination of the first anchor points.

SUMMARY

Embodiments of the present disclosure aim at providing a method and an apparatus for communication connection, an electronic device, and a wireless transmission system to solve the problem of "a prior art multi-link connection system in which there is an uneven allocation of link resources among multiple links and the links cannot be efficiently utilized due to the uncertain determination of the first anchor point in each link".

The present disclosure is implemented as follows.

In a first aspect, an embodiment of the present disclosure provides a communication connection method, applicable to a master device in a wireless transmission system, the method comprising: determining a time to send an $N^{th}$ connection request to an $N^{th}$ slave device in the wireless transmission system, and determining an initial anchor point of an $N^{th}$ connection link according to a relationship between the time to send the $N^{th}$ connection request and a time point at which a connection event in a first connection link occurs, where N is a positive integer greater than or equal to 2 and less than or equal to M, M is the total number of slave devices preset in the master device to which data can be transmitted simultaneously, and the first connection link is a connection link established between the master device and a first slave device; and sending the $N^{th}$ connection request to the $N^{th}$ slave device so that the $N^{th}$ connection link is established between the master device and the $N^{th}$ slave device, where the $N^{th}$ connection request carries the initial anchor point of the $N^{th}$ connection link, wherein there is an identical connection interval between anchor points in each link, and a connection event in each connection interval in each link occupies 1/M of the connection interval; and the connection event represents an effective data transmission period in one connection interval.

In the embodiment of the present disclosure, the initial anchor point of a slave device is determined from the relationship between the time at which a connection request is to be sent from the master device to the slave device and the time point at which a connection event in a first connection link occurs, and a connection event in each connection interval in each link occupies 1/M of the connection interval. In this way, the first anchor point of a link corresponding to each salve device can be determined reasonably, and the connection events in the individual links are distributed evenly in one connection interval, thereby achieving a balanced allocation of link resources.

With reference to the technical solution according to the first aspect described above, in some possible implementations, the method further includes, before sending the $N^{th}$ connection request to the $N^{th}$ slave device, sending a first connection request to the first slave device so that the first connection link is established between the master device and the first slave device, where the first connection request carries an initial anchor point of the established first connection link; and the initial anchor point of the first connection link is determined from the time at which the first connection request is sent.

In the embodiment of the present disclosure, the initial anchor point in the first connection link established between the master device and the first slave device is determined based directly on the time at which the first connection request is sent. Such mode is simple and easy and will not affect the link allocation, because there is only one current connection link.

With reference to the technical solution according to the first aspect described above, in some possible implementations, the determination of an initial anchor point of an $N^{th}$ connection link according to a relationship between the time to send the $N^{th}$ connection request and a time point at which a connection event in a first connection link occurs includes: determining a period of occurrence of a connection event in the first connection link, wherein the time to send the $N^{th}$ connection request falls within the period. When the time to send the $N^{th}$ connection request is within a period $$\left[T_n, T_n + \frac{N-1}{M} CI\right)$$

of occurrence of a connection event in the first connection link, the initial anchor point of the $N^{th}$ connection link is at $$T_n + \frac{N-1}{M}CI,$$

wherein $T_n$ is the moment corresponding to an $n^{th}$ anchor point in the first connection link; and CI denotes the connection interval. When the time to send the $N^{th}$ connection request is within a period $$\left[T_n + \frac{N-1}{M}CI, T_{n+1}\right)$$

of occurrence of a connection event in the first connection link, the initial anchor point of the $N^{th}$ connection link is at $$T_n + \left(1 + \frac{N-1}{M}\right)CI,$$

wherein $T_{n+1}$ is the moment corresponding to a $(n+1)^{th}$ anchor point in the first connection link.

In the embodiment of the present disclosure, the initial anchor point of the $N^{th}$ connection link is determined from a different period of occurrence of a connection event in the first connection link within which the time to send the $N^{th}$ connection request falls. In this way, an unreasonable allocation of link resources is avoided, thereby efficiently utilizing the links.

With reference to the technical solution according to the first aspect described above, in some possible implementations, the method further includes, after sending an $M^{th}$ connection request to an $M^{th}$ slave device so that an $M^{th}$ connection link is established between the master device and the $M^{th}$ slave device, transmitting target data simultaneously to the M slave devices.

With reference to the technical solution according to the first aspect described above, in some possible implementations, the method further includes, while transmitting target data simultaneously to the M slave devices, determining a throughput rate corresponding to the current connection event in each connection link; when a difference between the throughput rates corresponding to any two connection events is greater than a preset threshold, extending backwards a connection event with the lower throughput rate to c/M times the connection interval, and deleting a connection event(s) of a connection link(s) corresponding to a time equal to $$\frac{c-1}{M}$$

times the connection interval, adjacent to the connection event with the lower throughput rate, where c is a positive integer greater than or equal to 2.

In the embodiment of the present disclosure, when the difference between the throughput rates corresponding to any two connection events is greater than a preset threshold, a connection event with the lower throughput rate is extended backwards to c/M times the connection interval, and a connection event(s) of a link(s) corresponding to a time equal to $$\frac{c-1}{M}$$

times the connection interval, adjacent to the connection event with the lower throughput rate is deleted. In this way, a method of temporarily extending the length of a connection event of a connection link with a lower throughput rate is used so that the throughput rate in the connection link can be increased rapidly in a short time, thereby achieving the purpose of dynamically adjusting the link resources.

With reference to the technical solution according to the first aspect described above, in some possible implementations, M is equal to 2, and the first slave device and the second slave device are paired wireless earphones.

In a second aspect, an embodiment of the present disclosure provides a communication connection apparatus, applicable to a master device in a wireless transmission system, the apparatus comprising: a determination module configured to determine a time to send an $N^{th}$ connection request to an $N^{th}$ slave device in the wireless transmission system, and determine an initial anchor point of an $N^{th}$ connection link according to a relationship between the time to send the $N^{th}$ connection request and a time point at which a connection event in a first connection link occurs, where N is a positive integer greater than or equal to 2 and less than or equal to M, M is the total number of slave devices preset in the master device to which data can be transmitted simultaneously, and the first connection link is a connection link established between the master device and a first slave device; and a connection module configured to send the $N^{th}$ connection request to the $N^{th}$ slave device so that the $N^{th}$ connection link is established between the master device and the $N^{th}$ slave device, where the $N^{th}$ connection request carries the initial anchor point of the $N^{th}$ connection link, wherein there is an identical connection interval between anchor points in each link, and a connection event in each connection interval in each link occupies 1/M of the connection interval; and the connection event represents an effective data transmission period in one connection interval.

In a third aspect, an embodiment of the present disclosure provides an electronic device, comprising a processor and a memory, wherein the processor and the memory are connected to each other. The memory is configured to store a program. The processor is configured to run the program stored in the memory to execute a method according to the above embodiment of the first aspect and/or according to some possible implementations with reference to the above embodiment of the first aspect.

In a fourth aspect, an embodiment of the present disclosure provides a wireless transmission system, comprising a master device and M slave devices. The master device is configured to establish a communication connection with the M slave devices by executing a method according to the above embodiment of the first aspect and/or according to some possible implementations with reference to the above embodiment of the first aspect.

With reference to the technical solution according to the fourth aspect described above, in some possible implementations, M is equal to 2, and the two slave devices are paired wireless earphones.

In a fifth aspect, an embodiment of the present disclosure provides a storage medium storing a computer program that, when run by a processor, executes a method according to the above embodiment of the first aspect and/or according to some possible implementations with reference to the above embodiment of the first aspect.

BRIEF DESCRIPTION OF THE DRAWINGS

In order to more clearly illustrate the technical solutions of the embodiments of the present disclosure, drawings required for use in the embodiments of the present disclosure will be described briefly below. It is to be understood that the drawings below are merely illustrative of some embodiments of the present disclosure, and therefore should not be considered as limiting its scope. It will be understood by those of ordinary skill in the art that other relevant drawings can also be obtained from these drawings without any inventive effort.

DETAILED DESCRIPTION OF THE EMBODIMENTS

The technical solutions in the embodiments of the present disclosure will be described below with reference to the accompanying drawings in the embodiments of the present disclosure.

In view of the problem of a prior art multi-link connection system in which there is an uneven allocation of link resources among multiple links and the links cannot be efficiently utilized due to the uncertain determination of the first anchor point in each link, the following embodiments are proposed by the inventors of the present disclosure through research and exploration to solve the above-mentioned problem.

Figure 1:
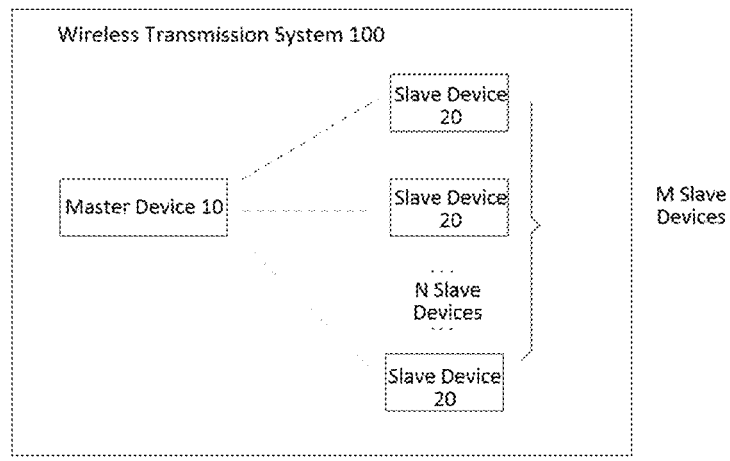
FIG. 1 is a schematic structural diagram of a wireless transmission system according to an embodiment of the present disclosure.

Referring to FIG. 1, an embodiment of the present disclosure provides a wireless transmission system 100. The system includes a master device 10 and M slave devices 20.

The master device 10 may establish a communication connection with the M slave devices 20 by a communication connection method. In other words, the master device 10 may establish independent connection links with the M slave devices 20, respectively.

Here, the master device 10 may be any electronic device with a communication module. For example, the electronic device may be, but is not limited to, a personal computer (PC), a smart phone, a tablet computer, a personal digital assistant (PDA), a mobile Internet device (MID), or the like.

Figure 2:
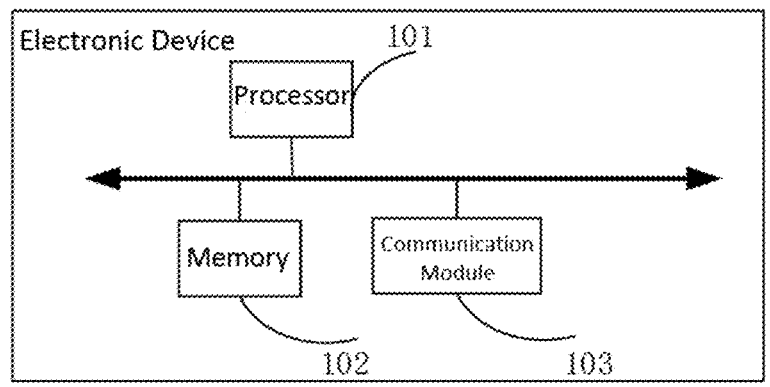
FIG. 2 is a schematic structural diagram of an electronic device according to an embodiment of the present disclosure.

In terms of structure, referring to FIG. 2, the electronic device may include a processor 101, a memory 102, and a communication module 103.

The processor 101 is directly or indirectly electrically connected to the memory 102 and the communication module 103 to implement data transmission or interaction. For example, these elements may be electrically connected to one another via one or more communication buses or signal lines. The communication connection apparatus includes at least one software module that can be stored in the memory 102 in the form of software or firmware or solidified in an operating system (OS) of the electronic device. The processor 101 is configured to execute executable modules stored in the memory 102, for example, software functional modules and computer programs included in the communication connection apparatus, so as to implement the communication connection method. The processor 101 may execute the computer program after receiving an execution instruction.

Here, the processor 101 may be an integrated circuit chip with signal processing capability. The processor 101 may also be a general-purpose processor, for example, may be a central processing unit (CPU), a digital signal processor (DSP), an application specific integrated circuit (ASIC), a discrete gate or transistor logic device or discrete hardware component, which can implement or execute the methods, steps, and logic block diagrams disclosed in the embodiments of the present disclosure. In addition, the general-purpose processor may be a microprocessor or any conventional processor or the like.

The memory 102 may be, but is not limited to, a random access memory (RAM), a read only memory (ROM), a programmable read-only memory (PROM), an erasable programmable read-only memory (EPROM), or an electric erasable programmable read-only memory (EEPROM). The memory 102 is configured to store a program, and the processor 101 executes the program after receiving an execution instruction.

The above-mentioned communication module 103 may be, but is not limited to, a Bluetooth module, a Wi-Fi module, or a Zigbee module.

It should be understood that the structure shown in FIG. 2 is for illustration only, and the above-mentioned electronic device may have fewer or more components than those shown in FIG. 2, or have a different configuration from that shown in FIG. 2. In addition, each component shown in FIG. 2 may be implemented by software, hardware, or a combination thereof.

Here, the slave device is a device that passively accepts a connection, and the slave device also comprises a communication module corresponding to that of the master device. Specifically, the slave device may be a device such as a wireless earphone, a smart watch, or a smart household appliance.

Figure 3:
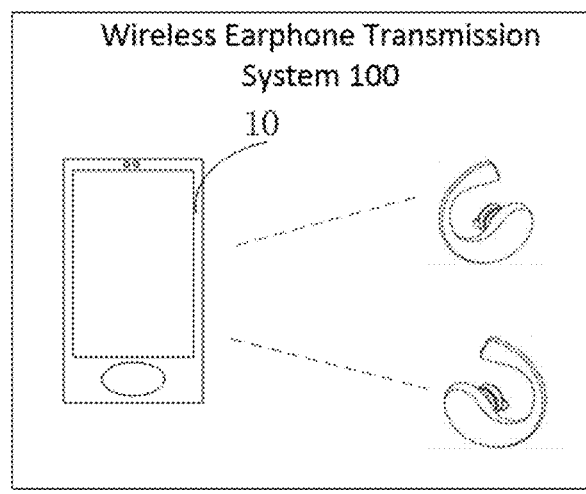
FIG. 3 is a schematic structural diagram of another wireless transmission system according to an embodiment of the present disclosure.

Referring to FIG. 3, when the slave device is a wireless earphone, the above-mentioned wireless transmission system 100 is a wireless earphone transmission system. The system includes a master device 10 (such as a smart phone) and paired wireless earphones. The paired wireless earphones are two slave devices. One of the slave devices is the earphone for the left ear, and the other slave device is the earphone for the right ear.

In other embodiments, the above-mentioned system may be a smart home wireless transmission system. Correspondingly, the slave devices may be a plurality of Bluetooth speakers respectively placed in different positions in the house, which is not limited in the present disclosure.

Figure 4:
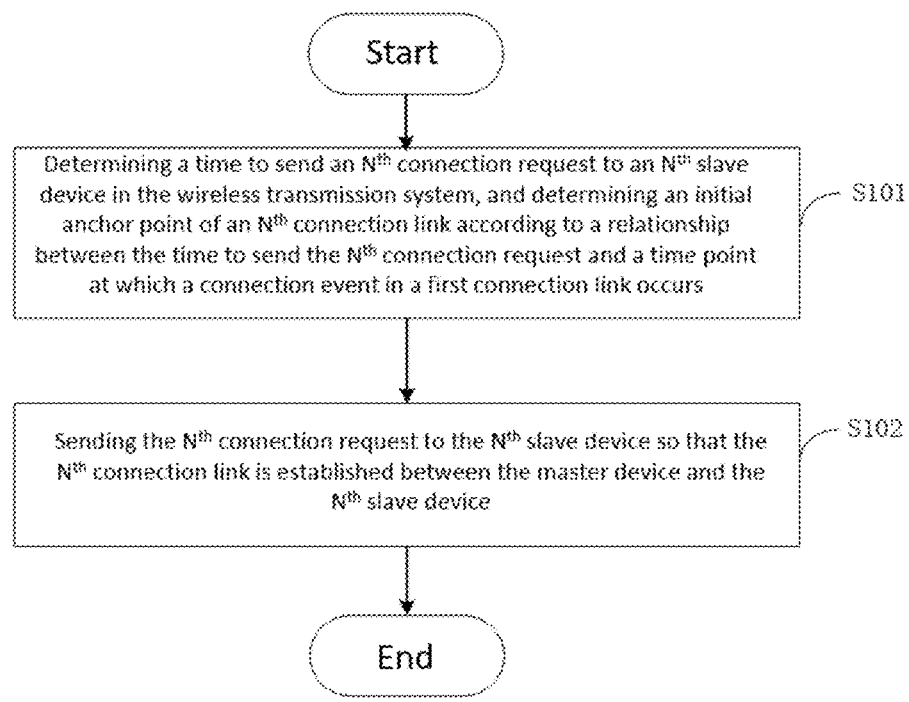
FIG. 4 is a flowchart of steps of a communication connection method according to an embodiment of the present disclosure.

Referring to FIG. 4, FIG. 4 is a flowchart of steps of a communication connection method according to an embodiment of the present disclosure. The method is applicable to a master device in a wireless transmission system. It should be noted that the communication connection method according to the embodiment of the present disclosure is not limited to a sequence shown in FIG. 4 and to a sequence shown below. The method includes step S101 to step S102.

In step S101, a time to send an $N^{th}$ connection request to an $N^{th}$ slave device in the wireless transmission system is determined, and an initial anchor point of an $N^{th}$ connection link is determined according to a relationship between the time to send the $N^{th}$ connection request and a time point at which a connection event in a first connection link occurs.

Here, N is a positive integer greater than or equal to 2 and less than or equal to M, M is the total number of slave devices preset in the master device to which data can be transmitted simultaneously, and the first connection link is a connection link established between the master device and a first slave device.

In step S102, the $N^{th}$ connection request is sent to the $N^{th}$ slave device so that the $N^{th}$ connection link is established between the master device and the $N^{th}$ slave device.

Here, the $N^{th}$ connection request carries the initial anchor point of the $N^{th}$ connection link, wherein there is an identical connection interval between anchor points in each link, and a connection event in each connection interval in each link occupies 1/M of the connection interval.

It should be noted that the connection event (CE) represents an effective data transmission period (or interval) in one connection interval. In each link, an effective data transmission operation will be performed in the CE period, and no data will be transmitted in a time period other than the CE. The connection interval is an interval between two adjacent anchor points in a link. The starting point of each connection event is an anchor point.

In summary, in the embodiment of the present disclosure, the initial anchor point of a slave device is determined from the relationship between the time at which a connection request is to be sent from the master device to the slave device and the time point at which a connection event in a first connection link occurs, and a connection event in each connection interval in each link occupies 1/M of the connection interval. In this way, the first anchor point of a M link corresponding to each salve device can be determined reasonably, and the connection events in the individual links are distributed evenly in one connection interval, thereby achieving a balanced allocation of link resources.

The procedures and steps of the above-mentioned communication connection method are described below in connection with specific examples.

It should be noted that when the wireless transmission system includes a plurality of slave devices, the communication connection method provided in the embodiment of the present disclosure firstly establishes a communication connection with the first slave device. In other words, a first connection link is established with respect to the first slave device, and then the initial anchor points of connection links to be established with respect to other slave devices are determined based on the established first connection link.

In other words, before the step S101, the method further includes: sending a first connection request to a first slave device so that a first connection link is established between the master device and the first slave device. Here, the first connection request carries an initial anchor point of the established first connection link. The initial anchor point of the first connection link is determined from the time at which the first connection request is sent.

Exemplarily, for ease of understanding, the initial anchor point of the first connection link is predefined as $T_n$, and the connection interval is predefined as CI, then $T_{n+1}=T_n+CI$; and the connection event of the first connection link occupies a period $$\left[T_n, T_n + \frac{1}{M}CI\right],$$

wherein M is the total number of slave devices preset in the master device to which data can be transmitted simultaneously. When M=2, the connection event of the first connection link occupies a period $$\left[T_n, T_n + \frac{1}{2}CI\right].$$

When M=3, the connection event of the first connection link occupies a period $$\left[T_n, T_n + \frac{1}{3}CI\right].$$

In other words, after the initial anchor point of the first connection link is determined by the above step, all anchor points and connection events of the entire link can be determined according to the predefined connection interval and connection event period.

In the embodiment of the present disclosure, the initial anchor point in the first connection link established between the master device and the first slave device is determined based directly on the time at which the first connection request is sent. Such mode is simple and easy and will not affect the link allocation, because there is only one current connection link.

In addition, in an embodiment of the present disclosure, the first slave device is determined by the following step, including: searching for a broadcast data packet in a preset area to determine the first slave device.

It should be noted that slave devices generally have their respective corresponding identifiers, and broadcast data packets sent from the slave devices will carry their respective corresponding identifiers. For example, different slave devices can be distinguished by the broadcast addresses or broadcast data of the slave devices. The identifiers corresponding respectively to the slave devices represent the respective primary and secondary keys of the slave devices. In other words, the identifiers corresponding respectively to the slave devices can be used for distinguishing the identities of the slave devices. For example, wireless earphones are taken as an example. The wireless earphones are two slave devices. One of the slave devices is the earphone for the left ear, and the other slave device is the earphone for the right ear. The two earphones are also distinguished as primary and secondary ones. Assuming that the earphone for the right ear is the primary earphone, the earphone for the right ear is the secondary earphone. The primary and secondary earphones can be determined by their respective identifiers. In this case, the first slave device is the earphone for the left ear (namely, the first slave device is the primary earphone). Thus, this step is performed by: searching for a broadcast data packet from the earphone for the left ear in a preset area.

The above-mentioned preset area may be determined according to the specific communication mode. For example, if the communication mode is a Bluetooth mode, the preset area may be within a range of 8 to 30 meters centered around the master device. For another example, if the communication mode is a Wi-Fi mode, the preset area may be within a range of 80 meters centered around the master device.

Specifically, the Bluetooth mode is taken as an example. When Bluetooth is activated in the master device, the master device starts scanning in the preset area, searches for a broadcast data packet in the preset area, determines the first slave device, and establishes a connection with the first slave device. The time to send the first connection request is determined from the time at which the broadcast data packet is acquired from the first slave device, and then the initial anchor point of the first connection link is determined according to the determined time to send the first connection request. It should be noted that the initial anchor point of the first connection link may be determined by means of adding a fixed time delay to the obtained time. For example, when the time to send the first connection request is determined, the initial anchor point of the first connection link may be obtained by adding a fixed time delay to the time to send the first connection request. In this mode, the connection link is an ACL (Asynchronous Connection-Oriented Link).

After the first connection link is determined, connection links of other slave devices are determined based on the first connection link. In the step S101, the time to send the $N^{th}$ connection request to the $N^{th}$ slave device in the wireless transmission system is also determined based on the time at which a broadcast data packet is acquired from the $N^{th}$ slave device. In other words, the master device continues to acquire broadcast data packets in the preset area. A device corresponding to the $N^{th}$ broadcast data packet acquired in the preset area is the $N^{th}$ slave device. Then, the time to send the $N^{th}$ connection request to the $N^{th}$ slave device is determined based on the time at which the broadcast data packet is acquired from the $N^{th}$ slave device.

It should be noted that, in the embodiment of the present disclosure, the $N^{th}$ connection request means that a total of N connection requests will be sent from the master device. In other words, N slave devices correspond to N connection requests, and the $N^{th}$ connection request is to be sent to the $N^{th}$ slave device. The master device sends only one connection request to each slave device.

Specifically, the determination of the initial anchor point of the $N^{th}$ connection link according to the relationship between the time to send the $N^{th}$ connection request and the time point at which a connection event in the first connection link occurs includes: determining a period of occurrence of a connection event in the first connection link within which the time to send the $N^{th}$ connection request falls. When the time to send the $N^{th}$ connection request is within a period $$\left[T_n, T_n + \frac{N-1}{M}CI\right)$$

of occurrence of a connection event in the first connection link, the initial anchor point of the $N^{th}$ connection link is at $$T_n + \frac{N-1}{M}CI,$$

wherein $T_n$ is the moment corresponding to an $n^{th}$ anchor point in the first connection link; and CI denotes the connection interval. When the time to send the $N^{th}$ connection request is within a period $$\left[T_n, + \frac{N-1}{M}CI, T_{n+1}\right)$$

of occurrence of a connection event in the first connection link, the initial anchor point of the $N^{th}$ connection link is at $$T_n + \left(1 + \frac{N-1}{M}\right)CI,$$

wherein $T_{n+1}$ is the moment corresponding to a $(n+1)^{th}$ anchor point in the first connection link.

Exemplarily, when M is equal to 2, it is necessary to establish two connection links. The initial anchor point in the first connection link is determined directly according to the time to send the first connection request. The initial anchor point in the second connection link should be determined in the manner described above.

Figure 5:
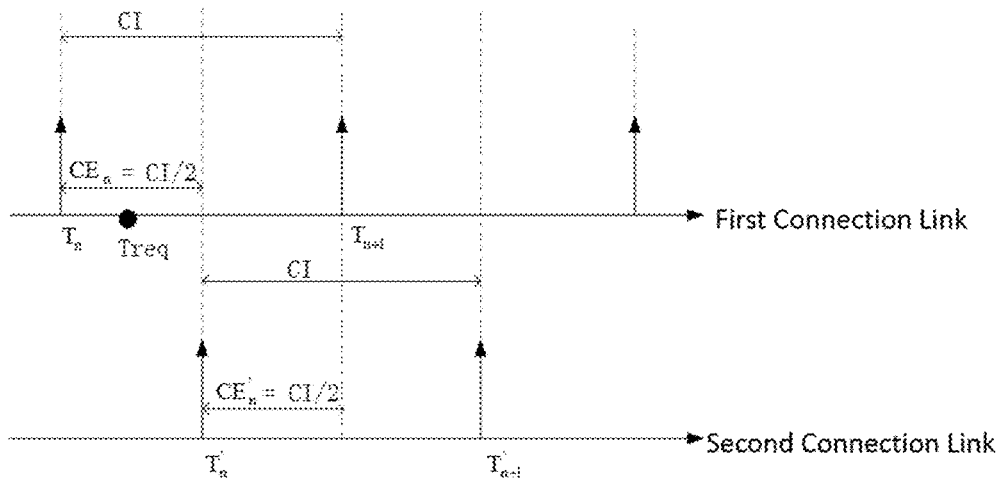
FIG. 5 is a schematic diagram showing distribution of connection events in two connection links according to an embodiment of the present disclosure.

As shown in FIG. 5, when the time Treq to send the second connection request is within a period $$\left[T_n, T_n + \frac{1}{2}CI\right)$$

of occurrence of a connection event in the first connection link, the initial anchor point $T'_n$ of the second connection link is at $$T_n + \frac{1}{2}CI,$$

namely, $$T'_n = T_n + \frac{1}{2}CI.$$

Here, $CE_n$ is a connection event in a connection interval $[T_n, T_{n+1}]$ in the first connection link; and $CE'_n$ is a connection event in a connection interval $[T_n, T'_{n+1}]$ in the second connection link.

Figure 6:
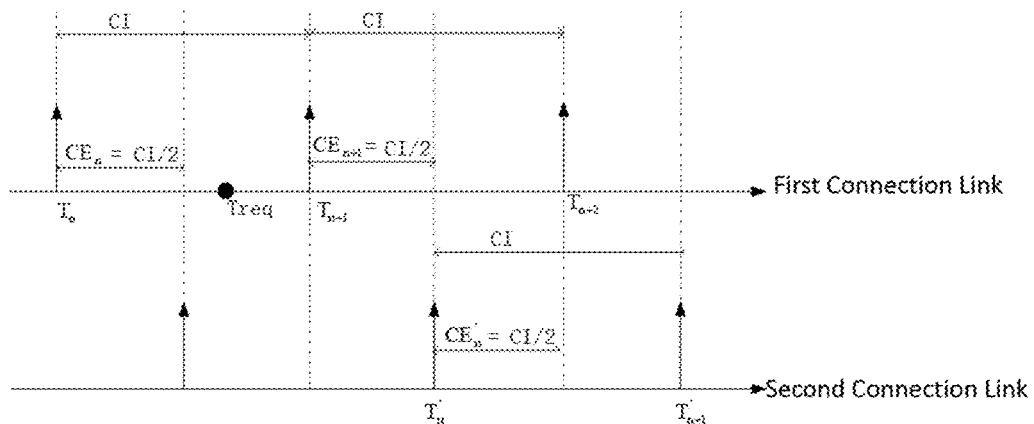
FIG. 6 is a schematic diagram showing another distribution of connection events in two connection links according to an embodiment of the present disclosure.

As shown in FIG. 6, when the time Treq to send the second connection request is within a period $$\left[T_n + \frac{1}{2}CI, T_{n+1}\right)$$

of occurrence of a connection event in the first connection link, the initial anchor point $T'_n$ of the second connection link is at $$T_n + \left(1 + \frac{1}{2}\right)CI,$$

namely, $$T'_n = T_n + \left(1 + \frac{1}{2}\right)CI.$$

$CE_{n+1}$ is a connection event in a connection interval $[T_{n+1}, T_{n+2}]$ in the first connection link; and $CE'_n$ is a connection event in a connection interval $[T'_n, T_{n+1}]$ in the second connection link.

Exemplarily, when M is equal to 3, it is necessary to establish three connection links. The initial anchor point in the first connection link is determined directly according to the time to send the first connection request. The initial anchor point in the second connection link should be determined in the manner described above. When the time Treq to send the second connection request is within a period $$\left[T_n, T_n + \frac{1}{3}CI\right)$$

or occurrence or a connection event in the first connection link, the initial anchor point of the second connection link is at $$T_n + \frac{1}{3}CI.$$

When the time Treq to send the second connection request is within a period $$\left[T_n + \frac{1}{3}CI, T_{n+1}\right)$$

of occurrence of a connection event in the first connection link, the initial anchor point of the second connection link is at $$T_n + \left(1 + \frac{1}{3}\right)CI.$$

Correspondingly, the initial anchor point in the third connection link can also be determined in the same manner with reference to the foregoing process, and a detailed description is omitted here.

In summary, in the embodiment of the present disclosure, the initial anchor point of the $N^{th}$ connection link is determined from a different period of occurrence of a connection event in the first connection link within which the time to send the $N^{th}$ connection request falls. In this way, an unreasonable allocation of link resources is avoided, thereby efficiently utilizing the links.

Optionally, the method further includes, after sending an $M^{th}$ connection request to an $M^{th}$ slave device so that an $M^{th}$ connection link is established between the master device and the $M^{th}$ slave device, transmitting target data simultaneously to the M slave devices.

In other words, after connection links have been established with respect to all the slave devices, target data can be transmitted simultaneously to the M slave devices. It should be noted that the target data refers to data to be synchronously transmitted. For example, when the slave devices are audio devices such as earphones, the target data to be transmitted at this time may be data for the left and right channels. Some control data may actually be transmitted at different time points via the respective links. This is not limited in the present disclosure.

Optionally, the embodiment of the present disclosure also provides a mode for dynamically adjusting link resources while transmitting target data simultaneously to the M slave devices, which specifically includes: determining a throughput rate corresponding to the current connection event in each connection link; when a difference between the throughput rates corresponding to any two connection events is greater than a preset threshold, extending backwards a connection event with the lower throughput rate to c/M times the connection interval, and deleting a connection event(s) of a connection link(s) corresponding to a time equal to $$\frac{c-1}{M}$$

times the connection interval, adjacent to the connection event with the lower throughput rate, where c is a positive integer greater than or equal to 2.

It should be noted that both the value of c and the preset threshold described above may be set as required. For example, the value of c may be 2, 3, or 4. This is not limited in the present disclosure.

Figure 7:
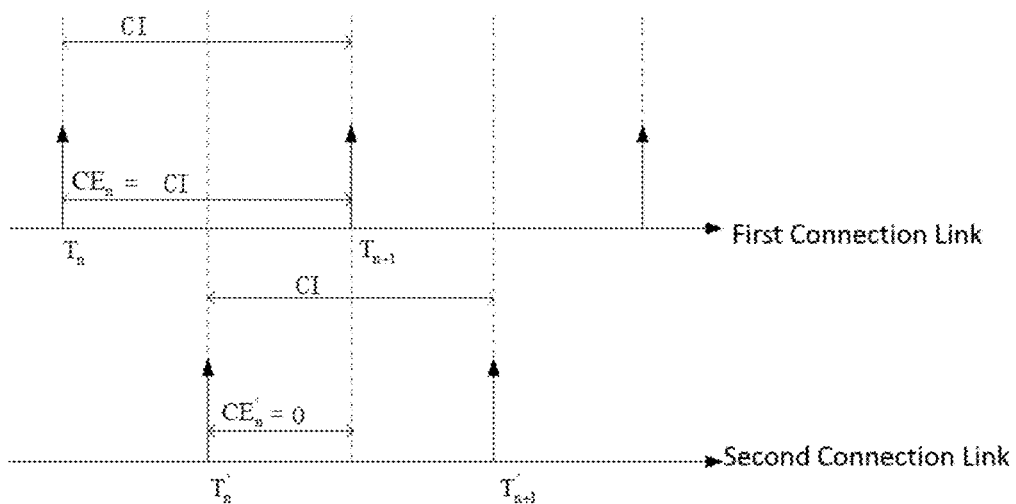
FIG. 7 is a schematic diagram showing dynamic adjustment of connection events according to an embodiment of the present disclosure.

Exemplarily, referring to FIG. 7, when M is equal to 2, the first connection link has a current connection event $CE_n$ with a current throughput rate THP1, and the second connection link has a current connection event $CE'_n$ with a current throughput rate THP2. Assuming that the difference between THP1 and THP2 is greater than a preset threshold THPthr, and THP1 is a smaller value, the connection event with the lower throughput rate will be extended backwards to 1 times as long as the connection interval (assuming M=2 and c=2). Correspondingly, a connection event of a connection link corresponding to a time equal to ½ of the connection interval, adjacent to the connection event with the lower throughput rate is deleted. In other words, the connection event $CE'_n$ in the corresponding period of the second connection link is set to 0.

Figure 8:
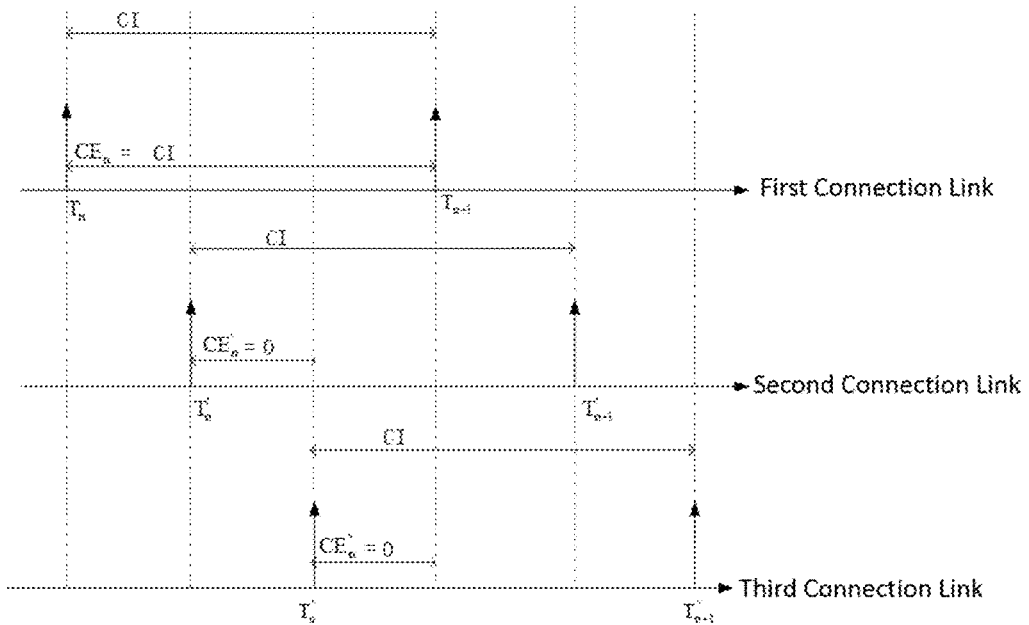
FIG. 8 is a schematic diagram showing another dynamic adjustment of connection events according to an embodiment of the present disclosure.

Exemplarily, referring to FIG. 8, when M is equal to 3, the first connection link has a current connection event $CE_n$ with a current throughput rate THP1, the second connection link has a current connection event $CE'_n$ with a current throughput rate THP2, and the third connection link has a current connection event $CE''_n$ with a current throughput rate THP3. Assuming that the difference between THP1 and THP3 is greater than a preset threshold THPthr, and THP1 is a smaller value, the connection event with the lower throughput rate is extended backwards to 1 times as long as the connection interval (where M=3 and c=3). Correspondingly, connection events of connection links corresponding to a time equal to ⅔ of the connection interval, adjacent to the connection event with the lower throughput rate are deleted. In other words, both the connection event $CE'_n$ in the corresponding period of the second connection link and the connection event $CE''_n$ in the corresponding period of the third connection link are set to 0.

In summary, in the embodiment of the present disclosure, when the difference between the throughput rates corresponding to any two connection events is greater than a preset threshold, a connection event with the lower throughput rate is extended backwards to c/M times the connection interval, and a connection event(s) of a link(s) corresponding to a time equal to $$\frac{c-1}{M}$$

times the connection interval, adjacent to the connection event with the lower throughput rate is deleted. In this way, a method of temporarily extending the length of a connection event of a connection link with a lower throughput rate is used so that the throughput rate in the connection link can be increased rapidly in a short time, thereby achieving the purpose of dynamically adjusting the link resources.

Figure 9:
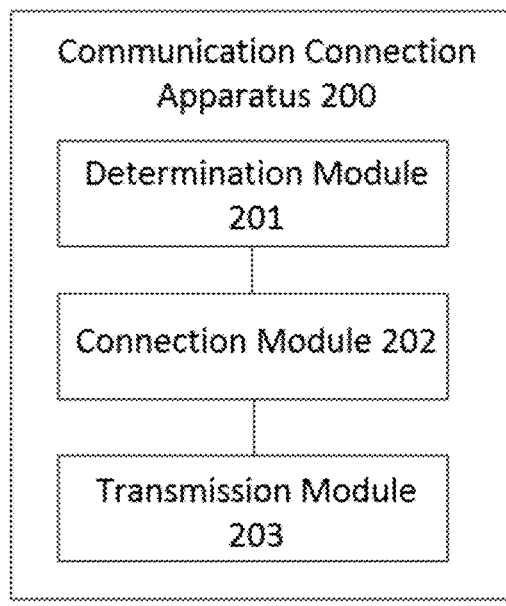
FIG. 9 is a block diagram of modules of a communication connection apparatus according to an embodiment of the present disclosure.

Referring to FIG. 9, based on the same inventive concept, an embodiment of the present disclosure further provides a communication connection apparatus 200, comprising a determination module 201 and a connection module 202.

The determination module 201 is configured to determine a time to send an $N^{th}$ connection request to an $N^{th}$ slave device in the wireless transmission system, and determine an initial anchor point of an $N^{th}$ connection link according to a relationship between the time to send the $N^{th}$ connection request and a time point at which a connection event in a first connection link occurs, where N is a positive integer greater than or equal to 2 and less than or equal to M, M is the total number of slave devices preset in the master device to which data can be transmitted simultaneously, and the first connection link is a connection link established between the master device and a first slave device.

The connection module 202 is configured to send the $N^{th}$ connection request to the $N^{th}$ slave device so that the $N^{th}$ connection link is established between the master device and the $N^{th}$ slave device, where the $N^{th}$ connection request carries the initial anchor point of the $N^{th}$ connection link. Here, there is an identical connection interval between anchor points in each link, and a connection event in each connection interval in each link occupies 1/M of the connection interval. The connection event represents an effective data transmission period in one connection interval.

Optionally, the connection module 202 is further configured to send a first connection request to the first slave device so that the first connection link is established between the master device and the first slave device, before sending the $N^{th}$ connection request to the $N^{th}$ slave device, where the first connection request carries an initial anchor point of the established first connection link; and the initial anchor point of the first connection link is determined from the time at which the first connection request is sent.

Optionally, the determination module 202 is specifically configured to determine a period of occurrence of a connection event in the first connection link within which the time to send the $N^{th}$ connection request falls. When the time to send the $N^{th}$ connection request is within a period $$\left[T_n, T_n + \frac{N-1}{M}CI\right)$$

of occurrence of a connection event in the first connection link, the initial anchor point of the $N^{th}$ connection link is at $$T_n + \frac{N-1}{M}CI,$$

wherein $T_n$ is the moment corresponding to an $n^{th}$ anchor point in the first connection link; and CI denotes the connection interval. When the time to send the $N^{th}$ connection request is within a period $$\left[T_n + \frac{N-1}{M}CI, T_{n+1}\right)$$

of occurrence of a connection event in the first connection link, the initial anchor point of the $N^{th}$ connection link is at $$T_n + \left(1 + \frac{N-1}{M}\right)CI,$$

wherein $T_{n+1}$ is the moment corresponding to a $(n+1)^{th}$ anchor point in the first connection link.

Optionally, the apparatus further includes a transmission module 203.

The transmission module 203 is configured to transmit target data simultaneously to the M slave devices after an $M^{th}$ connection request is sent to an $M^{th}$ slave device so that an $M^{th}$ connection link is established between the master device and the $M^{th}$ slave device.

Optionally, the transmission module 203 is further configured to determine a throughput rate corresponding to the current connection event in each connection link; and to extend, when a difference between the throughput rates corresponding to any two connection events is greater than a preset threshold, a connection event with the lower throughput rate is extended backwards to c/M times the connection interval, and delete a connection event(s) of a connection link(s) corresponding to a time equal to $$\frac{c-1}{M}$$

times the connection interval, adjacent to the connection event with the lower throughput rate, where c is a positive integer greater than or equal to 2.

It should be noted that, as will be clearly appreciated by those skilled in the art, the specific operating processes of the system, apparatus, and units described above may be performed with reference to the corresponding processes in the foregoing embodiment of the method and therefore will not be described in detail herein for ease and brevity of the description.

Based on the same inventive concept, an embodiment of the present disclosure further provides a storage medium storing a computer program that, when run, executes the method provided in the foregoing embodiment.

The storage medium may be any available medium that can be accessed by a computer, or a data storage device such as a server or a data center integrated with one or more available media. The available medium may be a magnetic medium (e.g., a floppy disk, a hard disk, or a magnetic tape), an optical medium (e.g., a DVD), a semiconductor medium (e.g., a solid state disk (SSD)), or the like.

In the embodiments according to the present disclosure, it should be understood that the disclosed apparatus and method may be implemented in other ways. The embodiments of the apparatus described above are merely illustrative in nature. For example, the units are divided only by logical functions, and additional division modes may be adopted in practical implementation. For another example, multiple units or components may be combined or integrated into another system, or some features may be omitted or not executed. In addition, the mutual coupling, or direct coupling or communication connection illustrated or discussed may be implemented via indirect coupling or communication connection between some communication interfaces, apparatuses, or units, which may be electronic, mechanical, or in other forms.

In addition, the units described as separate components may be or not be separated physically. The components illustrated as units may be or not be physical units. In other words, they may be located at one place or they may be distributed onto multiple network units. Some or all of the units may be selected as actually required to achieve the objectives of the solutions of the present embodiments.

Besides, the individual functional modules in the embodiments of the present disclosure may be integrated together to form an independent part, or each of the modules may be physically stand-alone, or two or more of the modules may be integrated into an independent part.

Relationship terms such as first, second, and the like are used herein only for distinguishing one entity or operation from another entity or operation, while it is not necessarily required or implied that these entities or operations have any such practical relationship or order.

The above description is merely illustrative of the embodiments of the present disclosure and is not intended to limit the scope of protection of the present disclosure. It will be understood by those skilled in the art that various modifications and variations may be made to the present disclosure. Any modifications, equivalent alternatives, improvements and so on made within the spirit and principle of the present disclosure are intended to be encompassed within the scope of protection of the present disclosure.

What is claimed is:

1. A communication connection method, applicable to a master device in a wireless transmission system, wherein the method comprises:
   determining a time to send an $N^{th}$ connection request to an $N^{th}$ slave device in the wireless transmission system, and determining an initial anchor point of an $N^{th}$ connection link according to a relationship between the time to send the $N^{th}$ connection request and a time point at which a connection event in a first connection link occurs, wherein N is a positive integer greater than or equal to 2 and less than or equal to M, M is a total number of slave devices preset in the master device, wherein data is able to be transmitted simultaneously to the slave devices, and the first connection link is a connection link established between the master device and a first slave device; and
   sending the $N^{th}$ connection request to the $N^{th}$ slave device, so that the $N^{th}$ connection link is established between the master device and the $N^{th}$ slave device, wherein the $N^{th}$ connection request carries the initial anchor point of the $N^{th}$ connection link,
   wherein a connection interval between anchor points in each link is identical, and a connection event in each connection interval in each link occupies 1/M of the connection interval; and the connection event represents an effective data transmission period in one connection interval,
   wherein the communication connection method further comprises, after sending an $M^{th}$ connection request to an $M^{th}$ slave device so that an $M^{th}$ connection link is established between the master device and the $M^{th}$ slave device,
   transmitting target data to M slave devices simultaneously; and the communication connection method further comprises, in a process of the transmitting target data to M slave devices simultaneously,
   determining a throughput rate corresponding to a current connection event in each connection link; and
   extending backwards a connection event with a lower throughput rate to c/M times the connection interval, and deleting a connection event, adjacent to the connection event with the lower throughput rate, of a connection link corresponding to a time equal to $$\frac{c-1}{M}$$

times the connection interval, wherein c is a positive integer greater than or equal to 2, when a difference between throughput rates corresponding to any two connection events is greater than a preset threshold.

2. The communication connection method according to claim 1, further comprising, before sending the $N^{th}$ connection request to the $N^{th}$ slave device,
   sending a first connection request to the first slave device, so that the first connection link is established between the master device and the first slave device, wherein the first connection request carries an initial anchor point of an established first connection link; and the initial anchor point of the first connection link is determined based on a time at which the first connection request is sent.

3. The communication connection method according to claim 1, wherein the determining an initial anchor point of an $N^{th}$ connection link according to a relationship between the time to send the $N^{th}$ connection request and a time point at which a connection event in a first connection link occurs comprises:
   determining a period of occurrence of a connection event in the first connection link, wherein the time to send the $N^{th}$ connection request falls within the period, wherein when the time to send the $N^{th}$ connection request is within a period $$\left[T_n, T_n + \frac{N-1}{M}CI\right)$$

of occurrence of a connection event in the first connection link, the initial anchor point of the $N^{th}$ connection link is at $$T_n + \frac{N-1}{M}CI,$$

wherein $T_n$ is a moment corresponding to an $n^{th}$ anchor point in the first connection link; and CI denotes the connection interval; and
   when the time to send the $N^{th}$ connection request is within a period $$\left[T_n + \frac{N-1}{M}CI, T_{n+1}\right)$$

of occurrence of a connection event in the first connection link, the initial anchor point of the $N^{th}$ connection link is at $$T_n + \left(1 + \frac{N-1}{M}\right)CI,$$

wherein $T_{n+1}$ is a moment corresponding to a $(n+1)^{th}$ anchor point in the first connection link.

4. The communication connection method according to claim 1, wherein M is equal to 2, and the first slave device and a second slave device are paired wireless earphones.

5. The communication connection method according to claim 2, wherein M is equal to 2, and the first slave device and a second slave device are paired wireless earphones.

6. The communication connection method according to claim 3, wherein M is equal to 2, and the first slave device and a second slave device are paired wireless earphones.

7. A communication connection apparatus, applicable to a master device in a wireless transmission system, wherein the apparatus comprises:
- a determination module, configured to determine a time to send an $N^{th}$ connection request to an $N^{th}$ slave device in the wireless transmission system, and determine an initial anchor point of an $N^{th}$ connection link according to a relationship between the time to send the $N^{th}$ connection request and a time point at which a connection event in a first connection link occurs, wherein N is a positive integer greater than or equal to 2 and less than or equal to M, M is a total number of slave devices preset in the master device, wherein data is able to be transmitted simultaneously to the slave devices, and the first connection link is a connection link established between the master device and a first slave device; and
- a connection module, configured to send the $N^{th}$ connection request to the $N^{th}$ slave device, so that the $N^{th}$ connection link is established between the master device and the $N^{th}$ slave device, wherein the $N^{th}$ connection request carries the initial anchor point of the $N^{th}$ connection link, wherein a connection interval between anchor points in each link is identical, and a connection event in each connection interval in each link occupies 1/M of the connection interval; and the connection event represents an effective data transmission period in one connection interval, wherein the determination module is further configured to, after sending an $M^{th}$ connection request to an $M^{th}$ slave device so that an $M^{th}$ connection link is established between the master device and the $M^{th}$ slave device, transmit target data to M slave devices simultaneously; and the determination module is further configured to, in a process of the transmitting target data to M slave devices simultaneously, determine a throughput rate corresponding to a current connection event in each connection link; and extend backwards a connection event with a lower throughput rate to c/M times the connection interval, and delete a connection event, adjacent to the connection event with the lower throughput rate, of a connection link corresponding to a time equal to $$\frac{c-1}{M}$$

times the connection interval, wherein c is a positive integer greater than or equal to 2, when a difference between throughput rates corresponding to any two connection events is greater than a preset threshold.

8. A wireless transmission system, comprising the master device and M total number of the slave devices according to claim 1,
wherein the master device is configured to establish a communication connection with M total number of the slave devices by executing the method according to claim 1.

9. The wireless transmission system according to claim 8, wherein M is equal to 2, and two slave devices are paired wireless earphones.

\* \* \* \* \*